(12) United States Patent
Delaye et al.

(10) Patent No.: US 9,841,292 B2
(45) Date of Patent: Dec. 12, 2017

(54) SCREEN TRANSITIONS IN A GEOGRAPHIC APPLICATION

(71) Applicant: GOOGLE INC., Mountain View, CA (US)

(72) Inventors: Darren Delaye, San Francisco, CA (US); Su Chuin Leong, South San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/823,865

(22) Filed: Aug. 11, 2015

(65) Prior Publication Data
US 2016/0047669 A1  Feb. 18, 2016

Related U.S. Application Data

(60) Provisional application No. 62/036,485, filed on Aug. 12, 2014.

(51) Int. Cl.
*G01C 21/36* (2006.01)
*G06T 11/60* (2006.01)
(Continued)

(52) U.S. Cl.
CPC ......... *G01C 21/367* (2013.01); *G06F 3/0346* (2013.01); *G06F 3/048* (2013.01);
(Continued)

(58) Field of Classification Search
CPC . G01C 21/367; G01C 21/3667; G06F 3/0346; G06F 3/048; G06F 17/30241;
(Continued)

(56) References Cited

U.S. PATENT DOCUMENTS 8,581,844 B2 * 11/2013 Ho .................... G06F 1/1626
345/156
8,854,299 B2 * 10/2014 Bender ............... G06F 1/1694
345/156
(Continued)

FOREIGN PATENT DOCUMENTS

EP    1 926 075 A2    5/2008

OTHER PUBLICATIONS

"View Controller Programming Guide for iOS (Legacy)," (2013).
(Continued)

*Primary Examiner* — Todd Melton
(74) *Attorney, Agent, or Firm* — Marshall, Gerstein & Borun LLP

(57) ABSTRACT

The display device of a portable device is configured to operate in at least a first physical orientation and a second physical orientation. Instructions, when executed on one or more processors, cause the one or more processors to detect a first transition from the first physical orientation of the display device to the second physical orientation of the display device, detect a second transition from the second physical orientation of the display device to the first physical orientation of the display device, and, in response to the second transition, select a presentation format for displaying geographic content via the display device in the first physical orientation, based at least in part on a prior presentation format according to which the geographic content was presented via the display device prior to the first transition.

20 Claims, 5 Drawing Sheets

(51) Int. Cl.
  *G06F 17/30* (2006.01)
  *G06F 3/0346* (2013.01)
  *G06T 3/40* (2006.01)
  *G06F 3/048* (2013.01)

(52) U.S. Cl.
  CPC .......... *G06F 17/30241* (2013.01); *G06T 3/40* (2013.01); *G06T 11/60* (2013.01)

(58) Field of Classification Search
  CPC ...... G06F 3/017; G06F 3/0488; G06F 1/1698; G06F 2200/1637; G06T 3/40; G06T 11/60
  See application file for complete search history.

(56) References Cited

U.S. PATENT DOCUMENTS

| | | | | |
|---|---|---|---|---|
| 8,868,135 B2* | 10/2014 | Sirpal | ................... | G06F 3/1438 455/566 |
| 8,996,073 B2* | 3/2015 | Sirpal | ................... | G06F 3/1438 455/566 |
| 9,459,708 B2* | 10/2016 | Lee | ........................ | G06F 3/0346 |
| 2010/0095251 A1* | 4/2010 | Dunko | .............. | H04M 1/72572 715/863 |
| 2012/0176413 A1* | 7/2012 | Kulik | .................... | G06F 1/1626 345/659 |
| 2014/0101610 A1* | 4/2014 | Zhang | ............... | H04M 1/72583 715/810 |
| 2015/0113446 A1* | 4/2015 | Penha | ................... | G06F 3/0484 715/753 |
| 2015/0268733 A1* | 9/2015 | Govindapillai | ......... | G06F 3/017 715/863 |
| 2015/0378447 A1* | 12/2015 | Nagano | ................. | G06F 1/1626 700/85 |
| 2016/0034051 A1* | 2/2016 | Xi | ........................ | G06F 3/0346 345/156 |

OTHER PUBLICATIONS

International Preliminary Report on Patentability for Application No. PCT/US2015/044579, dated Feb. 14, 2017.
International Search Report and Written Opinion for Application No. PCT/US2015/044579, dated Nov. 2, 2015.
Mahlke et al., "Mobile Media Friendly—Applying Media Queries to ArcGIS API for JavaScript Applications," ArcUser Winter (2013).
Vast.Com, "Rotating to Show Different iOS Views—Vast Blog," (2012).

* cited by examiner

FIG. 3A  FIG. 3B

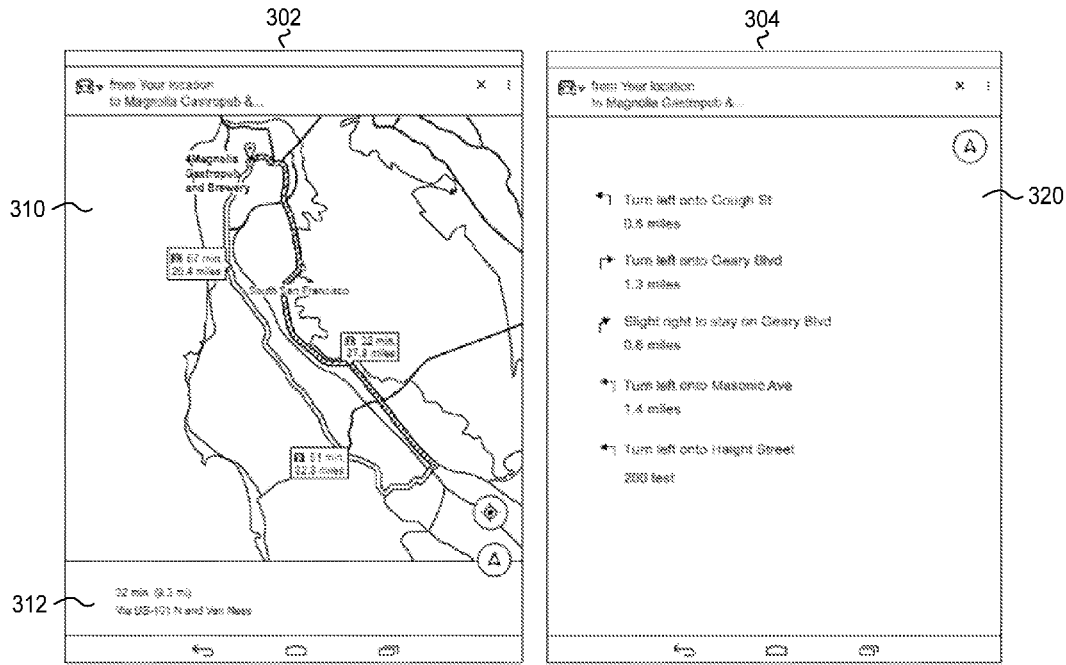
FIG. 4A
FIG. 4B
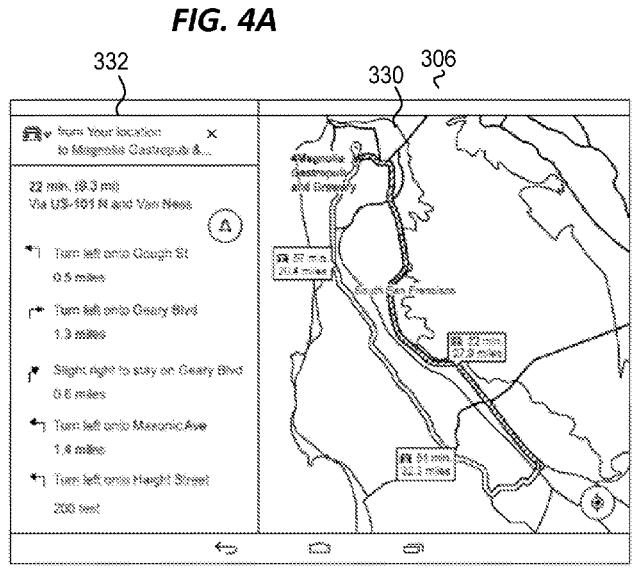
FIG. 4C

SCREEN TRANSITIONS IN A GEOGRAPHIC APPLICATION

FIELD OF TECHNOLOGY

This disclosure relates to interactive digital maps and, more particularly, to presenting geographic content according to various physical orientations of a display device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Software applications that provide interactive digital maps, driving directions, and various geographic functions ("geographic applications") can operate on computing devices in which display devices can operate in multiple orientations, such as "portrait" and "landscape." For example, today many tablet computers include accelerometers that detect changes in orientation substantially in real time and report these changes to the currently running software applications.

SUMMARY

A geographic application generates presentation of geographic content for display in accordance with a physical orientation of the display device as well as the history of previous presentations of geographic content. More specifically, the geographic application selects an efficient and intuitive presentation format and, in some cases, the level of detail for geographic content based on the current orientation of the display device and the current operational context of the geographic application. When the display device is rotated from a first orientation to a second orientation, the geographic application updates the presentation to better match the new, second orientation of the display device, and also stores an indication of the presentation format most recently used in the first orientation. If the display device is again rotated from the second orientation back to the first orientation, the geographic application can restore the presentation format previously used in the first orientation to make changes in presentation formats both efficient and intuitive.

One example embodiment of these techniques is a method for presenting geographic content via a display device. The method can be executed on one or more processors. The method includes generating, in a first instance, a first presentation of geographic content for display via a display device, when the display device has a first physical orientation. In a second instance, when the display device has the same first physical orientation, the method includes generating a second presentation of geographic content for display via the display device. The method further includes generating a shared third presentation of geographic content for display via the display device both when the display device transitions to a second physical orientation in the first instance and when the display device transitions to the second physical orientation in the second instance. When the display device displaying the third presentation of geographic content transitions to the first physical orientation, the method includes generating the first presentation of geographic content in response at least to determining that the physical device transitioned to the second physical orientation in the first instance and generating the second presentation of geographic content in response at least to determining that the physical device transitioned to the second physical orientation in the second instance.

Another example embodiment of these techniques is a method for presenting geographic content via a display device, which also can be executed on one or more processors. The method includes displaying geographic content via a display device according to a first presentation format or a second presentation format, when the display device is in a first physical orientation and, in response to an indication that the display device transitioned from the first physical orientation to the second physical orientation, displaying the geographic content according to a third presentation format. If user input of a certain type is received while the geographic content being displayed according to the third presentation format, the method includes updating the geographic content being displayed. In response to an indication that the display device returned from the second physical orientation to the first physical orientation, the method includes displaying the geographic content according to the first presentation format if no user input of the certain type was received, or displaying the geographic content according to the second presentation format if user input of the certain type was received.

Yet another example embodiment is a portable user device including one or more processors, a display device coupled to the one or more processors, one or more sensors coupled to the one or more processors, and a non-transitory computer-readable memory coupled to the one or more processors and storing instructions. The display device is configured to operate in at least a first physical orientation and a second physical orientation. The one or more sensors are configured to detect a physical orientation of the display device. The instructions, when executed on the one or more processors, cause the one or more processors to (i) detect a first transition from the first physical orientation of the display device to the second physical orientation of the display device, (ii) detect a second transition from the second physical orientation of the display device to the first physical orientation of the display device, and (iii) in response to the second transition, select a presentation format for displaying geographic content via the display device in the first physical orientation, based at least in part on a prior presentation format according to which the geographic content was presented via the display device prior to the first transition.

BRIEF DESCRIPTION OF THE DRAWINGS

FIGS. 3A-C illustrate several example presentation formats for providing a list of items related to a geographic area, which can be generated by the computing device of FIG. 2;

FIGS. 4A-C illustrate several example presentation formats for providing driving directions, which can be generated by the computing device of FIG. 2.

DETAILED DESCRIPTION OF THE DRAWINGS

Overview

A geographic application displays geographic content via a display device in various presentation formats dependent on the physical orientation of the display device, such as "portrait" and "landscape." When the user changes the physical orientation of the display device from a current orientation to a new orientation, the geographic application updates the presentation format and, in some cases, the geographic content, in view of (i) the new orientation of the display device and (ii) the orientation the display device prior to the current orientation. More generally, the geographic application can generate presentations of geographic content in view of the history of the physical orientation of the display device.

Figure 1:
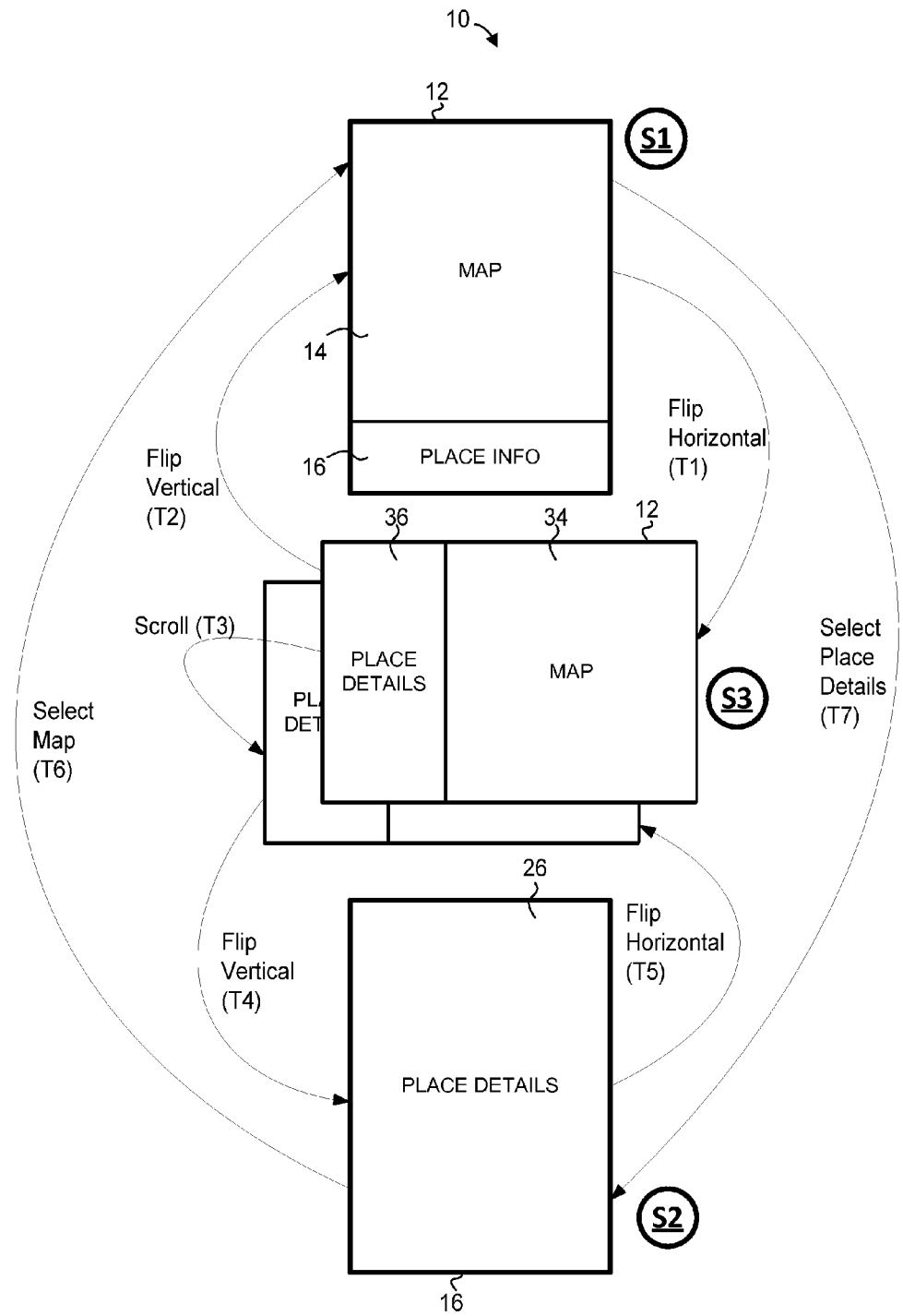
FIG. 1 is a state transition diagram of an example technique for presenting geographic content via a display device according to several physical orientations.

In an example scenario, the display device is the touchscreen of a tablet computer (or simply "tablet"). The tablet is in the portrait orientation, the geographic application displays a digital map occupying an upper portion of the screen along with an informational sheet occupying a lower portion of the screen. The informational sheet includes an overview of a certain business selected on the digital map. This example presentation of geographic content is schematically illustrated in FIG. 1 as state S1. If the geographic application detects an indication that the user wishes to view the information related to the selected business in more detail, the geographic application can adjust the presentation, so that the informational sheet now occupies substantially the entire screen. This example presentation of geographic content is schematically illustrated in FIG. 1 as state S2.

When the geographic application is in state S1,and the user rotates the tablet to the landscape orientation, the geographic application automatically adjusts the presentation to display the digital map on the right side of the screen and the informational sheet on the left side of the screen. This presentation is illustrated in FIG. 3 as state S3. The informational sheet can include the same or a different level of detail related to the selected business, depending on the implementation.

If the user then rotates the tablet to the portrait orientation, the geographic application transition from state S3 to restore state S1. However, if the user scrolls through the informational sheet in state S3 and then rotates the tablet to the portrait orientation, the geographic application instead transitions to state S2. When the user again rotates the tablet to the landscape orientation, the geographic application transitions from state S2 to state S3.

Thus, the geographic application can transition to state S3 from state S1 as well as from state S1, store an indication of the previous state in a memory, and transition to state S1 or state S2 from state S3 in accordance with the stored indication.

In general, these and similar techniques allow the geographic application to efficiently use screen real estate in different orientations of the display device, and make transitions more intuitive. As one specific example, when the user sits down while holding the display device and inadvertently causes the geographic application to change the presentation from portrait to landscape, the geographic application can restore the previous presentation in response to the user rotating the display device back to the portrait orientation.

Example State Transitions

A state transition diagram 10 of FIG. 1 illustrates transitions between several presentation formats of geographic content, in one embodiment of the techniques outlined above. An example geographic application that can implement these transitions, as well as an example user device on which the geographic application can run, are discussed below with reference to FIG. 2.

With continued reference to FIG. 1, the display device is in portrait orientation in states S1 and S2. According to the presentation format of state S1, a screen 12, available for displaying geographic content, includes a map screen 14 and an informational screen 16. The map screen 14 occupies the upper portion of the screen 12, and the informational screen 16 occupies the lower portion of the screen 12. The map screen 14 is significantly larger than the informational screen 16 in this example implementation. For example, the map screen 14 and the informational screen 16 can occupy approximately four-fifths and one-fifth, respectively, of the screen 12. The screens 14 and 16 may be independently operable. In other words, in some cases, a geographic application can update the display of one of the screens 14 and 16 in response to user input without updating the other one of the screens 14 and 16.

The geographic application can display an interactive digital map in the map screen 14 and information related to the digital map in the informational screen 16. For example, the digital map can correspond to a certain geographic area within which the user searched for a certain type of business, such as restaurant. The informational screen 16 can include an overview of place that corresponds to one of the search results. For example, the informational screen 16 can list some of the important information, such as the name of the restaurant, its rating, and the amount of time it would take to reach the restaurant by car.

According to the presentation format of state S2, an informational sheet 26 occupies the entire screen 12, or at least the majority of the screen 12. The informational sheet 26 can correspond to an expanded version of the informational sheet 16. For example, the informational sheet 26 can include a detailed description, one or more photographs, videos, etc. related to the restaurant briefly described in the informational sheet 16.

On the other hand, the presentation format of S3 can include a map screen 34 generally similar to the map screen 14, and an informational screen 36, which can include a detailed description of a place, generally similar to the informational screen 26. The relative layout of the screens in the presentation format of state S3 is different from the relative layout of the screens in the presentation format of state S1, in this example implementation. In particular, the informational screen 36 can be disposed on the left side of the screen 12, and the map screen 34 can be disposed on the right side of the screen 12. Further, the map screen 34 can occupy a significantly larger portion of the screen 12 than the informational screen 34 (e.g., three quarters vis-à-vis one quarter).

Example content of the screens 14, 16, 26, 34, and 36 is discussed in more detail below with reference to FIG. 3. More generally, however, any suitable presentation formats, with any suitable numbers and dimensions of screens, can be used.

The geographic application can transition from state S1 to state S2 in response to the display device changing orientation from portrait to landscape (transition T1). Similarly, the geographic application can transition from state S2 back to state S1 in response to the display device changing orientation from landscape to portrait (transition T2). However, as illustrated in FIG. 1, the geographic application can use the same presentation format for multiple "sub-states" in state S3. Thus, the geographic application can detect user interaction, such as one or several scroll commands, applied to the informational screen 36 in state S3, and transition to the other sub-state within state S3 (transition T3). As a result, when the display device then changes orientation from landscape to portrait, the geographic application transitions to state S2 (transition T4) rather than state S1. In other words, the geographic application can transition from state S3 to two different states in response to the same event, depending on whether the user interacted with the geographic content in state S2.

Still referring to FIG. 1, if the display device changes orientation from portrait to landscape when the geographic application is in state S2 (transition T5), the geographic application returns to the presentation format of state S3. More specifically, the geographic application returns to the sub-state from which the geographic application transitions to state S2 rather than state S1 in response to the display device changing orientation from landscape to portrait.

Thus, changes in orientation between portrait and landscape define loops S1-S3-S1-S3-etc. and S2-S3-S2-S3-etc. To implement these transitions, the geographic can store an indication of the presentation format and/or state in the previous orientation of the display device. For example, when the geographic application is in state S1 and the display device changes orientation from vertical to horizontal, the geographic application can store an indication state S2 prior to transition to state S3. In this manner, when the display device changes the physical orientation back to portrait, the geographic application can determine that it should transition from state S3 to state S2 rather than state S1.

In some implementations, the geographic application also can transition from state S2 to state 1 (transition T6) in response to the user activating a control in the informational screen 26 for displaying a digital map. The geographic application can transition from state S1 to state S3 (transition T7) in response to the user selecting a more detailed view of the place. For example, the user can click, tap, "pull," or otherwise activate the informational screen 16 to trigger the transition T7.

Example User Device

Figure 2:
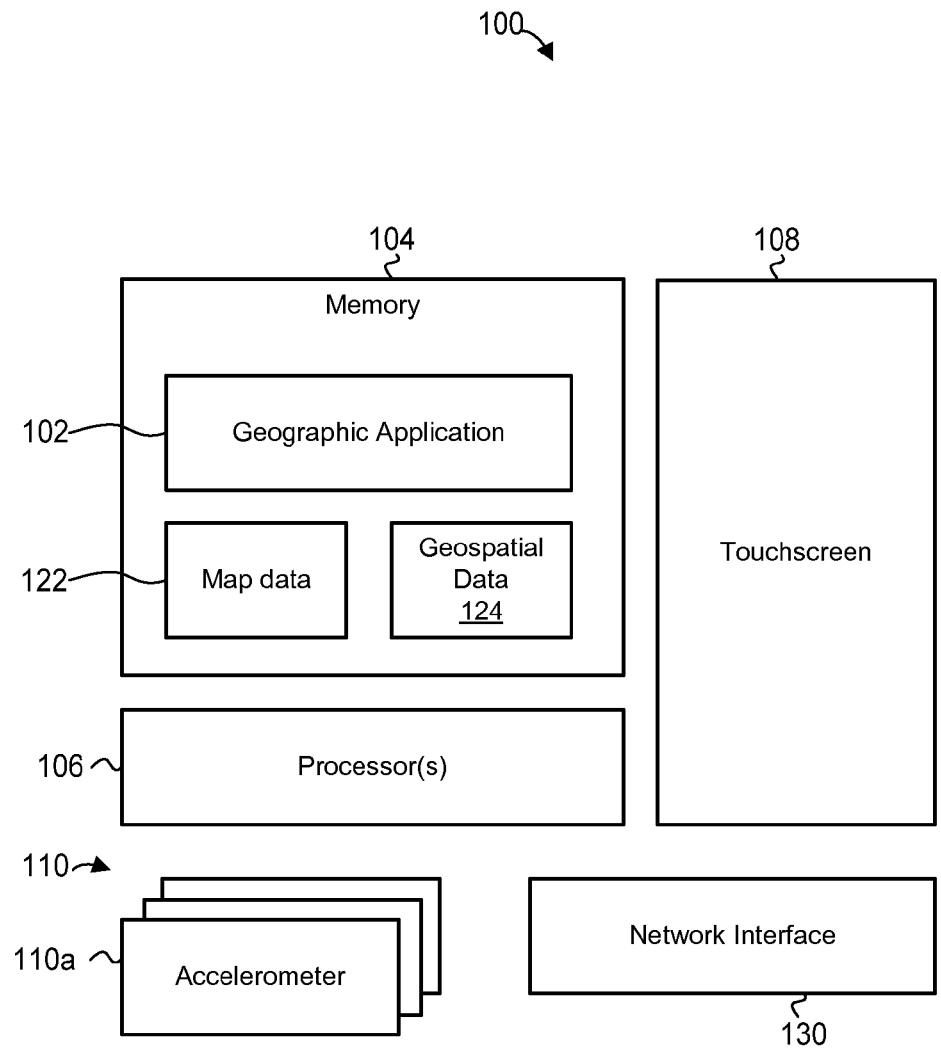
FIG. 2 is a block diagram of an example computing device in which the technique of FIG. 1 can be implemented.

FIG. 2 is a block diagram an example computing device 100 in which a geographic application can operate in accordance with the state transition diagram of FIG. 1. More particularly, the geographic application discussed above with reference to FIG. 1 can be implemented as a geographic application 102, stored as a set of instructions in a non-transitory computer-readable memory 104 and executable on one or more processor(s) 106. The computing device 100 can be a portable user device such as, for example, a tablet computer or a smart phone.

The processor(s) 106 can include a central processing unit (CPU) as well as a graphics processing unit (GPU) for efficiently rendering graphics content. The memory 104 can be a non-transitory memory including persistent (e.g., flash drive) and/or non-persistent (e.g., RAM) components.

The processor(s) 106 are coupled to a display device such as a touchscreen 18 via which the geographic application 102 can display geographic content such as, for example, digital maps, descriptions and multimedia content for geographic places, and navigation directions for driving, walking, bicycling, public transport, etc. The geographic application 102 also can receive gesture-based and other user input via the touchscreen 108. The touchscreen 108 can operate in multiple physical orientations such as portrait and landscape. In other implementations, the computing device 100 can include a display device configured to only display content and, separately from the display device, one or more input devices such as a keyboard or a mouse. More generally, the computing device 100 can include any number of input and output devices.

The processor(s) 106 also can be coupled to one or more sensors 110 such as an accelerometer 110a. In operation, the accelerometer 110a and/or another sensor can detect changes in the physical orientation of the touchscreen 108 if the touchscreen 108 can move independently of the other components of the computing device 100, or of the entire computing device 100 if the touchscreen 108 is rigidly fixed within the housing of the computing device 100. The geographic application 102 can receive an indication of the new orientation of the touchscreen 108 and generate a new presentation of geographic content in view of the new orientation. As further discussed with reference to FIGS. 3 and 4, the new presentation of geographic content can include a new presentation format such as the selection and layout of screens, and/or the level of detail at which some of the geographic content is being displayed.

The geographic application 102 can operate on map data 122 describing geographic features and other geospatial data 124 such as, for example, indexed data describing various places in one or several geographic areas. More particularly, the geospatial data 124 can include information about points of interest, brick-and-mortar businesses, user reviews, etc. The information can include text, photographs, videos, audio content, links to additional resources, etc.

The map data 122 can include descriptions of geometry and location indications for various natural geographic features (e.g., rivers, mountains, forests) as well as artificial geographic features (e.g., roads, buildings, parks). The map data 122 can include, among other data, vector graphics data, raster image data, and text data. In an example implementation, the map data 122 is organized into map tiles, which generally correspond to organization of geospatial data into two-dimensional regions of a predefined size. Each map tile in this case corresponds to a square geographic region, with the size of the square being dependent on the level of magnification, or zoom level. Thus, each map tile at a given zoom level is divided into four tiles at the next level, up to the highest zoom level.

The computing device 100 can retrieve the map data 122 and the geospatial data 124 from a network server (not shown) via a network interface 130.

Additional Examples of Presentation Formats for Geographic Content

Figure 3C:
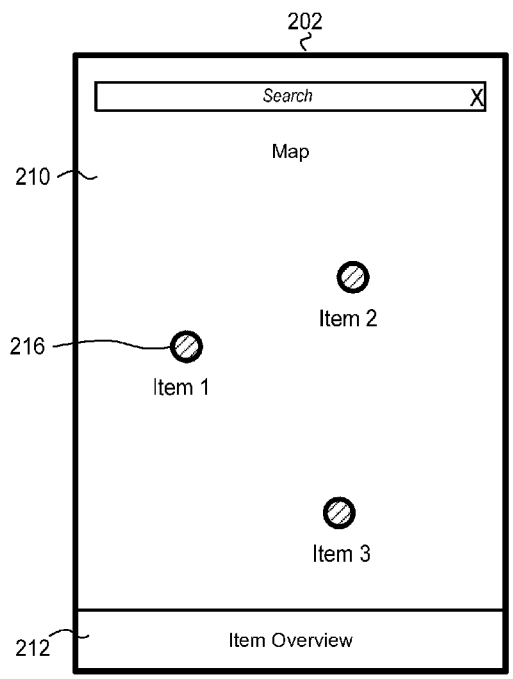
Figure 3C:
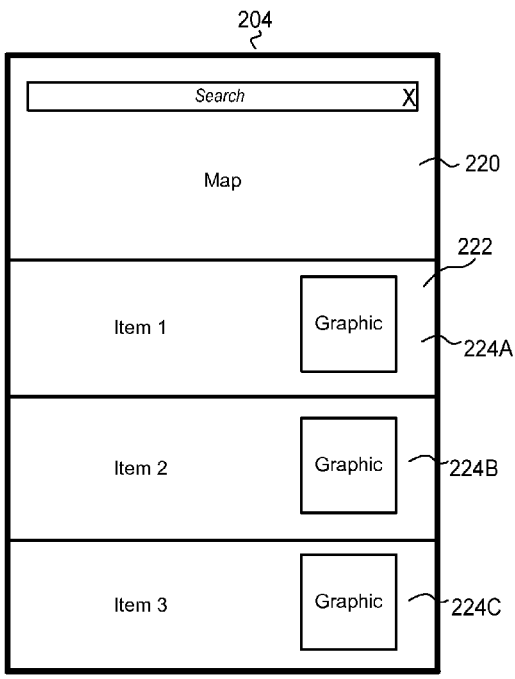
Figure 3C:
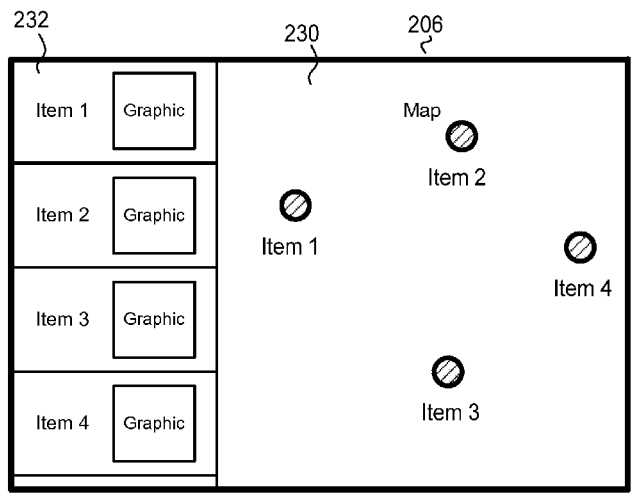

Referring to FIG. 3A-C, example presentation formats 202, 204, and 206 can correspond to states S1, S2, and S3, respectively. According to the presentation format 202, a map screen 210 occupies a large upper portion of the screen, and an informational screen 212 occupies a small lower portion of the screen. Location markers 216 indicate the locations on the map corresponding to selectable items related to a geographic query or automatic suggestions, for example. The informational screen 212 can include a brief overview of the currently selected item.

According to the presentation format 204, a map screen 220 occupies a smaller upper portion of the screen than the map screen 210. Depending on the implementation, the map screen 220 can display a zoomed-out version of the digital map displayed in the map screen 210, or only a portion of the digital map displayed in the map screen 210 at the same zoom level. The informational screen 222 can include a scrollable list of items 224A, 224B, 224C, etc. The informational screen 222 can be generated in response to the user activating the informational screen 212 of FIG. 3A, for example.

The presentation format 206 includes a map screen 230 that occupies a large right portion of the screen, and an informational screen 232 that occupies a small left portion of the screen. Similar to the informational screen 222, the informational screen 232 includes a scrollable list of selectable items. However, in this example implementation, the informational screen 232 includes a larger number of items.

FIGS. 4A-C illustrate another example set of presentation formats 302, 304, and 306 that can correspond to states S1, S2, and S3, respectively. The presentation format 302 includes a map screen 310 that occupies a large upper portion of the screen and in which a digital map with an overlaid navigation route is displayed. The presentation format 302 also includes an informational screen 312 that occupies a smaller lower portion of the screen, and in which the currently selected (or currently relevant) step of the navigation instructions is displayed.

According to the presentation format 304, the informational screen 322 occupies substantially the entire screen and includes a sequence of the navigation steps. In this example, the presentation format 304 does not include a map screen. The presentation format 306 includes a map screen 330 that occupies a large right portion of the screen, and an informational screen 332 that occupies a small left portion of the screen. Similar to the informational screen 322, the informational screen 332 includes a listing of navigation steps.

It is noted that the presentation formats of FIGS. 1, 3, and 4 are merely examples of presentation formats that can be used to provide geographic content via a display device. Moreover, in addition to geographic content, other types of content can be presented using the techniques of this disclosure.

Example Method for Presenting Geographic Content

Figure 5:
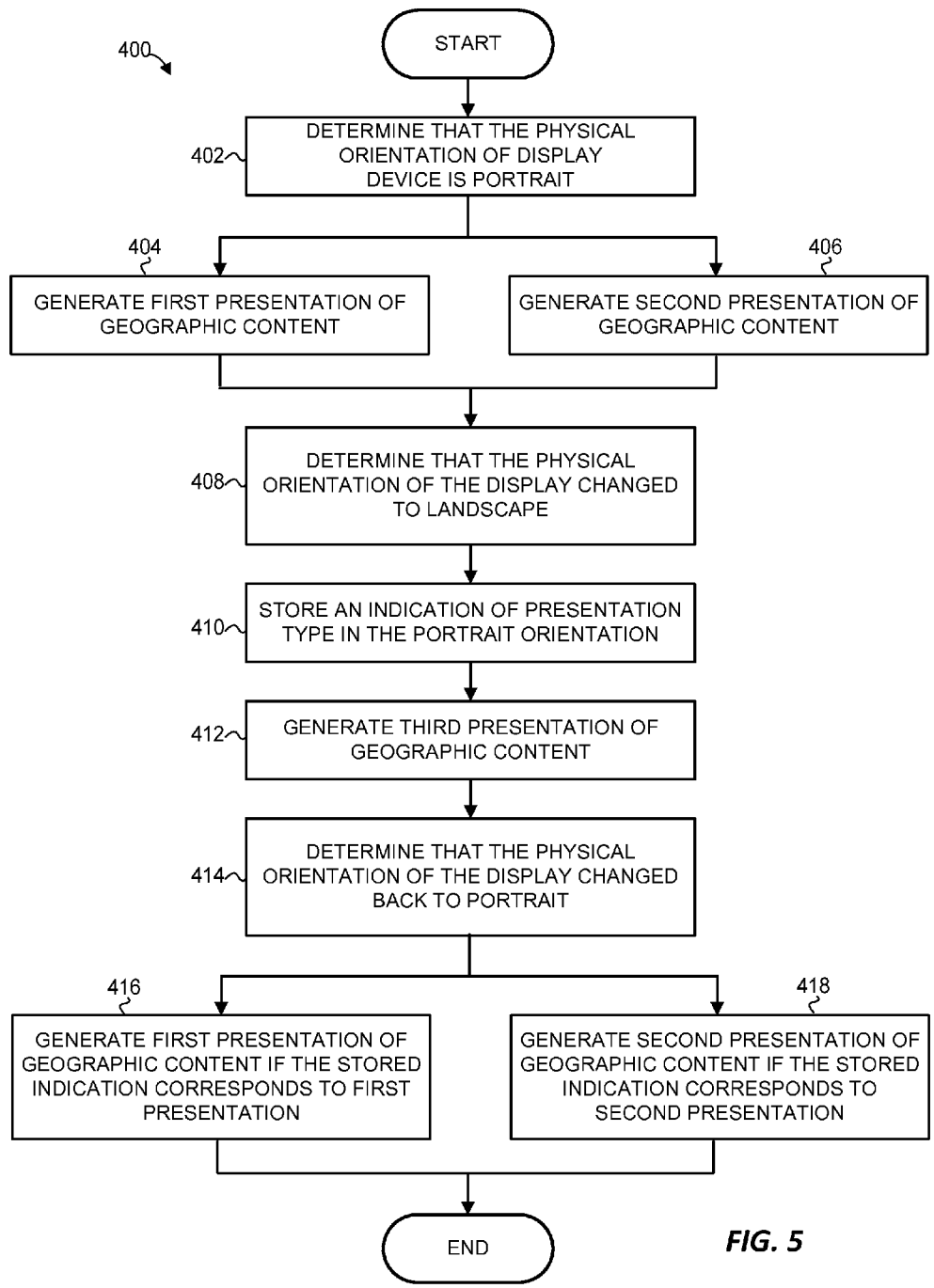
FIG. 5 is a flow diagram of an example method for presenting geographic content in view of different physical orientations of a display device.

Now referring to FIG. 5, a method 400 can be implemented in the geographic application 102, for example. The method 400 begins at block 402, where it is determined that the current physical orientation of the display device is portrait. Depending on the user commands and, in some cases, the history of previous presentation formats in portrait orientation, it is determined whether a first presentation or a second presentation of geographic content should be selected (blocks 404 and 406, respectively). The selections at block 404 and 406 can include, for example, a certain presentation format and the level of detail for geographic content displayed according to the selected presentation format. For example, the geographic application in a first instance can select the format 202 of FIG. 3A at block 404, and in a second instance can select the format 204 of FIG. 3B at block 406.

At block 408, is determined that the physical orientation of the display device has changed to landscape. The indication of the type of presentation used at blocks 404 and 406 is stored in a memory at block 410. For example, the indication can be stored in the memory 104 of FIG. 2. A new presentation of geographic content is then generated at block 412. In this scenario, the presentation is the same regardless of whether the geographic content was presented in accordance with block 404 or 406 in portrait orientation. For example, referring back to FIG. 3, the presentation format 206 can be used.

Next, at block 414, it is determined that the physical orientation of the display device changed back to portrait. In response, the presentation format of block 402 is restored at block 416 or the presentation format of block 406 is restored at block 418, depending on the stored indication. In other scenarios, however, the user may interact with the displayed content after the change in orientation at block 412, in which case the flow can proceed to block 416 or block 418 further in view of the user interaction.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of various embodiments. This description should be read to include one or at least one and the singular also includes the plural unless it is obvious that it is meant otherwise.

Upon reading this disclosure, those of ordinary skill in the art will appreciate still additional alternative structural and functional designs for presenting geographic content in view of the physical orientation of the display device and previous presentation formats through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for presenting geographic content via a display device, the method comprising:
   generating, by one or more processors in a first instance, a first presentation of geographic content for display via a display device, when the display device has a first physical orientation;
   generating, by the one or more processors in a second instance, a second presentation of geographic content for display via the display device, when the display device has the first physical orientation;
   generating, by the one or more processors, a shared third presentation of geographic content for display via the display device both when the display device transitions to a second physical orientation in the first instance and when the display device transitions to the second physical orientation in the second instance, including storing, in a computer-readable memory, an indication of a type of presentation of the geographic content prior to transitioning to the second physical orientation;
   when the display device displaying the third presentation of geographic content transitions to the first physical orientation:
      retrieve the stored indication from the computer-readable memory;
      generating, by the one or more processors, the first presentation of geographic content in response at least to determining that the physical device transitioned to the second physical orientation in the first instance, and
      generating, by the one or more processors, the second presentation of geographic content in response at least to determining that the physical device transitioned to the second physical orientation in the second instance.

2. The method of claim 1, wherein:
   generating the first presentation of geographic content includes generating (i) a map screen having a first size, in which a digital map is displayed and (ii) an informational screen having a second size, in which information related to the digital map is displayed, wherein the first screen and the second screen have a first relative arrangement,
   generating the second presentation of geographic content includes expanding the informational screen to a third size larger than the second size, and
   generating the second presentation of geographic content includes generating the map screen and the informational screen, wherein the map screen and the informational screen have a second relative arrangement.

3. The method of claim 2, further comprising:
   when the first presentation of geographic content is being displayed via the display device, detecting, by the one or more processors, user interaction with the informational screen; and
   in response to the detected user interaction, generating the second presentation of the geographic content.

4. The method of claim 2, further comprising:
   when the third presentation of geographic content is being displayed via the display device, detecting, by the one or more processors, user interaction with the informational screen;
   when the display device displaying the third presentation of geographic content transitions to the first physical orientation:
      generating, by the one or more processors, the second presentation of geographic content in response to (i) determining that the physical device transitioned to the second physical orientation in the first instance, and (ii) the user interaction with the informational screen.

5. The method of claim 2, wherein generating second independently operable screen includes displaying, within the second independently operable screen, at least one of:
   (i) information related to a place selected by the user on the digital map being displayed within the first independently operable screen,
   (ii) driving directions between two locations on the digital map being displayed within the first independently operable screen, or
   (iii) results of a geographic query related to the digital map being displayed within the first independently operable screen.

6. The method of claim 1, wherein:
   the first physical orientation is a portrait orientation, and the second physical orientation is a landscape orientation.

7. A method for presenting geographic content via a display device, the method comprising:
   displaying geographic content via a display device according to a first presentation format or a second presentation format, when the display device is in a first physical orientation;
   in response to an indication that the display device transitioned from the first physical orientation to the second physical orientation:
      storing, in a computer-readable memory, an indication of a type of presentation format, and displaying the geographic content according to a third presentation format;
if user input of a certain type is received while the geographic content being displayed according to the third presentation format, updating, by one or more processors, the geographic content being displayed; and
in response to an indication that the display device returned from the second physical orientation to the first physical orientation:
retrieving the stored indication from the computer-readable memory, displaying the geographic content according to the first presentation format if no user input of the certain type was received, or
displaying the geographic content according to the second presentation format if user input of the certain type was received.

8. The method claim 7, wherein:
displaying the geographic content according to the third presentation format includes displaying (i) a digital map of a geographic area in a map screen, and (ii) a scrollable list of items related to the geographic area in an informational screen; and
user input of the certain type includes a command to scroll through the list of items.

9. The method of claim 8, wherein the list of items corresponds to at least one of:
(i) information related to a place selected by the user on the digital map being displayed within the first independently operable screen,
(ii) driving directions between two locations on the digital map being displayed within the first independently operable screen, or
(iii) results of a geographic query related to the digital map being displayed within the first independently operable screen.

10. The method of claim 7, wherein:
displaying the geographic content according to the first presentation format includes generating (i) a map screen having a first size, in which a digital map is displayed and (ii) an informational screen having a second size, in which information related to the digital map is displayed, wherein the first screen and the second screen have a first relative arrangement,
displaying the geographic content according to the second presentation format includes expanding the informational screen to a third size larger than the second size, and
displaying the geographic content according to the third presentation format includes generating the map screen and the informational screen, wherein the map screen and the informational screen have a second relative arrangement.

11. The method of claim 7, further comprising:
while the display device is in the first physical orientation, detecting a user command applied to the geographic content displayed according to the first presentation format; and
in response to the detected user command, displaying the geographic content according to the second presentation format.

12. The method of claim 7, wherein:
the first physical orientation is a portrait orientation, and the second physical orientation is a landscape orientation.

13. A portable user device comprising:
one or more processors;
a display device coupled to the one or more processors and configured to operate in at least a first physical orientation and a second physical orientation;
one or more sensors coupled to the one or more processors and configured to detect a physical orientation of the display device; and
a non-transitory computer-readable memory coupled to the one or more processors and storing thereon instructions that, when executed on the one or more processors, cause the one or more processors to:
display geographic content according to a certain presentation format via the display device,
detect a first transition from the first physical orientation of the display device to the second physical orientation of the display device,
store, in the computer-readable memory, an indication of the presentation format, detect a second transition from the second physical orientation of the display device to the first physical orientation of the display device,
retrieve the stored indication of the presentation format from the computer-readable memory, and
in response to the second transition, select a presentation format for displaying geographic content via the display device in the first physical orientation, based at least in part on the presentation format according to which the geographic content was presented via the display device prior to the first transition.

14. The portable device of claim 13, wherein the instructions cause the one or more processors to select the presentation format further in view of whether user interaction with the geographic content was detected when the display device was in second physical orientation after the first transition but prior to the second transition.

15. The portable device of claim 14, wherein the instructions cause the one or more processors to:
restore the prior presentation format for use with the first physical orientation of the display device if no user interaction with the geographic content was detected when the display device was in second physical orientation after the first transition but prior to the second transition, and
select a presentation format different from the prior presentation format if user interaction with the geographic content was detected when the display device was in second physical orientation after the first transition but prior to the second transition.

16. The portable device of claim 13, wherein:
the first physical orientation is a portrait orientation, and the second physical orientation is a landscape orientation.

17. The portable device of claim 13, wherein the instructions cause the one or more processors, prior to the first transition, to display the geographic content according to a first presentation format or a second presentation format, wherein:
the first presentation format includes (i) a map screen in which a digital map is displayed, and (ii) an informational screen of a first size, in which information related to the digital map is displayed, and
the second presentation format includes the informational screen expanded to a second size larger than the first size.

18. The portable device of claim 17, wherein the instructions cause the one or more processors to display, within the informational screen, at least one of:
(i) information related to a place selected by the user on the digital map being displayed within the map screen, (ii) driving directions between two locations on the digital map being displayed within the map screen, or (iii) results of a geographic query related to the digital map being displayed within the map screen.

19. The portable device of claim 17, wherein the instructions further cause the one or more processors to:

in a first instance, display the geographic content according to the first presentation format, prior to the first transition, in a second instance, display the geographic content according to the second presentation format, prior to the first transition, and in response to the first transition, display the geographic content according to a shared third presentation format, prior to the second transition.

20. The portable device of claim 19, wherein:

in the first presentation format, the map screen and the informational screen have a first relative arrangement, and in the shared third presentation format, the map screen and the informational screen have a second relative arrangement.

\* \* \* \* \*